United States Patent [19]
Letchford et al.

[11] Patent Number: 6,031,060
[45] Date of Patent: Feb. 29, 2000

[54] FUNCTIONALIZED SILICONE POLYMERS AND PROCESSES FOR MAKING THE SAME

[75] Inventors: Robert James Letchford, Cherryville; James Anthony Schwindeman, Lincolnton, both of N.C.; Roderic Paul Quirk, Akron, Ohio

[73] Assignee: FMC Corporation, Philadelphia, Pa.

[21] Appl. No.: 09/082,072

[22] Filed: May 20, 1998

Related U.S. Application Data

[60] Provisional application No. 60/047,435, May 22, 1997.

[51] Int. Cl.$^7$ ...................................................... C08G 77/06
[52] U.S. Cl. ............................... 528/14; 528/10; 528/21; 528/23; 528/30; 528/37; 528/38; 556/437
[58] Field of Search .................................. 528/10, 38, 30, 528/14, 21, 23, 37

[56] References Cited

U.S. PATENT DOCUMENTS

| | | |
|---|---|---|
| 5,296,574 | 3/1994 | Hoxmeier . |
| 5,486,635 | 1/1996 | Okawa, T. ................ 556/437 |
| 5,561,210 | 10/1996 | Roy . |
| 5,618,903 | 4/1997 | Hoxmeier et al. . |

FOREIGN PATENT DOCUMENTS 1 289 526   9/1972   United Kingdom .

OTHER PUBLICATIONS

Yu et al., "Anionic polymerization and copolymerization of cyclosiloxanes initiated by trimethylsilylmethyllithium ", *Polymer Bulletin*, 32, 35–40 (1994).

Frye et al., "Reactions of Organolithium Reagents with Siloxane Substrates "*The Journal of Chemistry*, vol. 35, No. 5, pp. 1308–1314, ( May, 1970).

Lai et al., "Synthesis and Characterization of α,ω–Bis–(4–hydroxybutyl) Polydimethylsiloxanes", *Journal of Polymer Science: Part A: Polymer Chemistry*, vol. 33, 1773–1782 (1995).

Riffle, et al., "Elastomeric Polysiloxane Modifiers for Epoxy Networks ", *Epoxy Resin Chemistry II*, American Chemical Society, 1983, pp. 21–54.

Wilczek et al., "Preparation and Characterization of Narrow Molecular Mass Distribution Polydimethylsiloxanes ", *Polish Journal of Chemistry*, 55, 2419–2428 (1981).

McGrath, et al., "An Overview of the Polymerization of Cyclosiloxanes ", *Initiation of Polymerization*, American Chemical Society, 1983, pp. 145–172.

Yilgör et al., "Polysiloxane Containing Copolymers: A Survey of Recent Developments ", *Advances in Polymer Science*, 86, 1 (1988).

*Primary Examiner*—Melvyn I. Marquis
*Assistant Examiner*—Mark W. Milstead
*Attorney, Agent, or Firm*—Alston & Bird LLP

[57] ABSTRACT

Terminally functionalized silicone polymers prepared using protected functionalized initiators and processes for preparing the same. The silicone polymers includes protected, functionalized silicone polymers, such as mono-functional, homotelechelic, heterotelechelic, macromonomer, and radial polymers. The protected functionalized polymers can be optionally deprotected to afford functionalized silicone polymers.

33 Claims, No Drawings

FUNCTIONALIZED SILICONE POLYMERS AND PROCESSES FOR MAKING THE SAME

CROSS-REFERENCE TO RELATED APPLICATIONS

This application is related to copending Provisional Application Ser. No. 60/047,435, filed May 22, 1997, and claims the benefit of its filing date under 35 USC Section 119(e).

FIELD OF THE INVENTION

This invention relates to novel protected functionalized silicone polymers, their optionally deprotected analogues, and to processes for preparing silicone polymers.

BACKGROUND OF THE INVENTION

Silicone polymers have many unique properties, such as wide service temperature range; low viscosity change versus temperature; low flammability; shear stability; chemical inertness; oxidative stability; UV stability; low toxicity; and the like. These properties have facilitated their adoption as dielectric, hydraulic, heat transfer, power transmission and damping fluids. Silicone polymers have also found application as additives incorporated into plastics and rubbers as process and release aids, into coatings for flow and level control and into process streams as antifoams. Other unique properties have led to their introduction in acoustical applications such as ultrasonic sensor and sonar buoys. This proliferation of applications has engendered many improvements and refinements of silicone polymers.

Anionic polymerization of cyclosiloxanes, particularly hexamethylcyclotrisiloxane $D_3$ and octamethyltetrasiloxane $D_4$, has been reported previously. It is known that $D_3$ polymerization does not occur in hydrocarbon solvents. C. L. Frye, R. M. Salinger, F. W. Fearon, J. M. Klosowski and T. deYoung, *J. Org. Chem.*, 35, 1308 (1970). Although the anionic species was formed (Bu—Si($CH_3$)$_2$)—O—$Li^+$), it did not polymerize. Addition of a polar promoter, such as THF, diglyme, or DME then stimulated the polymerization. J. M. Yu, D. Teyssie, R. B. Khalife and S. Boileau, Polymer bulletin, 32, 35–40 (1994). The resultant polymer anion PDMS—O—$Li^+$ can then be protonated to afford PDMS-OH, capped with a silicon halide ($R^3R^4R^5$—Si—X) to afford PDMS—O—$SiR^3R^4R^5$, or coupled with suitable coupling agents ($SiCl_4$, $Me_2SiCl_2$, $HSi(OMe)_3$) to afford $(PDMS)_n$, wherein n is the number of coupling agent functionalities. In spite of considerable synthetic efforts, however, there are few good ways to affix functionality to the termini of the silicone polymers.

SUMMARY OF THE INVENTION

The present invention provides novel protected functionalized silicone polymers. Exemplary protected functionalized silicone polymers of the invention include protected functionalized polymers of formula (I):

$$(R^7R^8R^9-A)_m-T-Z-Q_n-(R^1R^2Si-O)_v-H \quad (I);$$

protected functionalized polymers of formula (II):

$$(R^7R^8R^9-A)_m-T-Z-Q_n-(R^1R^2Si-O)_v-SiR^3R^4R^5 \quad (II);$$

protected functionalized macromonomers of formula (II'):

$$(R^7R^8R^9-A)_m-T-Z-Q_n-(R^1R^2Si-O)_v-SiR^{3'}R^{4'}R^{5'} \quad (II');$$

protected homotelechelic polymers of formula (III):

$$[(R^7R^8R^9-A)_m-T-Z-Q_n-(R^1R^2Si-O)_v]_2-L \quad (III)$$

in which each —T—(A—$R^7R^8R^9$)$_m$ as defined below is the same;

protected heterotelechelic polymers of formula (III'):

$$[(R^7R^8R^9-A)_m-T-Z-Q_n-(R^1R^2Si-O)_v]_2-L \quad (III')$$

in which each —T—(A—$R^7R^8R^9$)$_m$ as defined below differs;

protected heterotelechelic polymers of formula (III"):

$$(R^7R^8R^9-A)_m-T-Z-Q_n-(R^1R^2Si-O)_v-FG \quad (III'')$$

in which —T—(A—$R^7R^8R^9$)$_m$ and FG differ; and protected radial polymers of the formula (IV):

$$[(R^7R^8R^9-A)_m-T-Z-Q_n-(R^1R^2Si-O)_v]_2-L' \quad (IV)$$

in which each —T—(A—$R^7R^8R^9$)$_m$ may be the same or different.

In each of Formula (I), (II), (II'), (III), (III'), (III"), and (IV) above:

Q is an unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—Z linkage;

n is an integer from 0 to 5;

Z is a branched or straight chain hydrocarbon connecting group which contains 3–25 carbon atoms, optionally substituted with aryl or substituted aryl;

T is selected from the group consisting of oxygen, sulfur, and nitrogen groups, and mixtures thereof;

(A—$R^7R^8R^9$)$_m$ is a protecting group in which A is an element selected from Group IVa of the Periodic Table of the Elements; $R^7$, $R^8$, and $R^9$ are each independently selected from the group consisting of hydrogen, alkyl, substituted alkyl, aryl, substituted aryl, cycloalkyl, and substituted cycloalkyl; and m is 1 when T is oxygen or sulfur, and 2 when T is nitrogen;

v is an integer from 2 to 100,000;

$R^1$ and $R^2$ are each independently selected from the group consisting of hydrogen, alkyl, substituted alkyl, alkenyl, substituted alkenyl, aryl, and substituted aryl;

$R^3$, $R^4$, and $R^5$ are each independently selected from the group consisting of hydrogen, alkyl, substituted alkyl, fluorinated alkyl, alkyl containing an acetal functionality, alkenyl, substituted alkenyl, aryl, and substituted aryl;

$R^{3'}$, $R^{4'}$, and $R^{5'}$ are each independently selected from the group consisting of hydrogen, alkyl, substituted alkyl, fluorinated alkyl, alkyl containing an acetal functionality, alkenyl, substituted alkenyl, aryl, substituted aryl, and free radically polymerizable groups, with the proviso that at least one $R^{3'}$, $R^{4'}$, and $R^{5'}$ is a free radically polymerizable group;

FG is a protected or non-protected functional group;

L is a residue of a difunctional linking agent, such as a $SiMe_2$ residue derived from the difunctional linking agent $SiMe_2Cl_2$;

L' is a residue of a multifunctional linking agent, such as a Si residue derived from the multifunctional linking agent $SiCl_4$; and z is an integer from 3 to 20.

The present invention also provides functionalized silicone polymers as described above in which at least one protecting group $—(A—R^7R^8R^9)_m$ has been removed to liberate the protected functionality T (oxygen, nitrogen, or sulfur). The functional groups can then optionally participate in various copolymerization reactions by reaction of the functional groups on the ends of the polymer arms with selected difunctional or polyfunctional comonomers as described in more detail below to provide a silicone polymer having polymer segments.

The novel polymers of the invention can be optionally hydrogenated to afford other novel polymers. The protecting groups can be removed either prior to or following hydrogenation.

The polymers of the invention can be prepared by anionic polymerization of one or more suitable siloxane monomers of the formula $(R^1R^2SiO)_y$, wherein $R^1$ and $R^2$ are as defined above and y is an integer from 3 to 10, in an inert solvent, optionally containing a polymerization promoter, at a temperature ranging from about −30° C. to about 250° C., for a period of at least one hour, with one or more protected functionalized initiators having the formula:

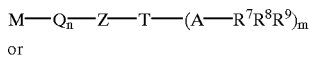

or

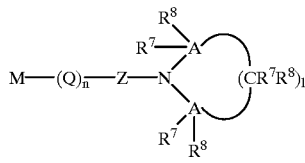

wherein each Q, Z, T, A, $R^7$, $R^8$, $R^9$, m, and n are as defined above; M is an alkali metal; and l is an integer from 1 to 7, to produce protected functionalized living silicon polymer anions. The anions are then reacted with a protonating, capping, functionalzing, or coupling agent to provide protected functionalized silicone polymers as described above.

The present invention can provide several advantages over prior silicone polymers and processes. Typically silicone polymers are produced using equilibrium reaction approaches. Such processes, however, provide limited or no control of polymer molecular weight distribution and byproducts. In contrast, the polymers of the present invention are prepared using anionic polymerization techniques. This allows production of polymers having a relatively narrow molecular weight distribution ($M_w/M_n$), typically less than about 1.5, and fewer byproducts.

In addition, the molecular architecture of polymers of the present invention can be precisely controlled. For example, the monomer composition and the length and molecular weight of the arms of multi-branched polymers can be independently manipulated by varying the monomer charged to the initiator. Also various protected functional groups and different protected heteroatoms can be introduced into the same multi-arm polymer molecule by employing a mixture of initiators that contain different heteroatoms. Further, differentially protected heteroatoms can be introduced into the same multi-arm polymer molecule by employing a mixture of initiators that contain different protecting groups.

Still further, different protecting groups can be removed sequentially to afford a polymer with some of the functional groups exposed, and some protected. The newly exposed functional groups can then participate in various copolymerization reactions, or reaction with methacroyl chloride to afford a macromonomer. The remaining protecting groups can then be removed, and then these functional groups can then participate in further copolymerization reactions.

DETAILED DESCRIPTION OF THE INVENTION

The silicone polymers of the present invention include the polymers of the following formulas:

protected functionalized polymers of formula (I):

    (I);

protected functionalized polymers of formula (II):

    (II);.

protected functionalized macromonomers of formula (II'):

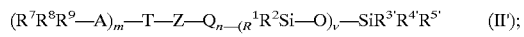    (II');

protected homotelechelic polymers of formula (III):

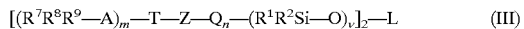    (III)

in which each $—T—(A—R^7R^8R^9)_m$ as defined below is the same;

protected heterotelechelic polymers of formula (III'):

$[(R^7R^8R^9—A)_n—T—Z—Q_n—(R^1R^2Si—O)_v]_2—L$    (III')

in which each $—T—(A—R^7R^8R^9)_m$ as defined below differs;

protected heterotelechelic polymers of formula (III"):

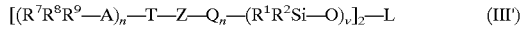    (III")

in which $—T—(A—R^7R^8R^9)_m$ and FG differ; and protected radial polymers of the formula (IV):

    (IV)

in which each $—T—(A—R^7R^8R^9)_m$ may be the same or different.

In each of Formula (I), (II), (II'), (III), (III'), (III"), and (IV) above:

Q is an unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—Z linkage;

n is an integer from 0 to 5;

Z is a branched or straight chain hydrocarbon connecting group which contains 3–25 carbon atoms, optionally substituted with aryl or substituted aryl;

T is selected from the group consisting of oxygen, sulfur, and nitrogen groups, and mixtures thereof;

$(A—R^7R^8R^9)_m$ is a protecting group in which A is an element selected from Group IVa of the Periodic Table of the Elements, and $R^7$, $R^8$, and $R^9$ are each independently selected from the group consisting of hydrogen, alkyl, substituted alkyl, aryl, substituted aryl, cycloalkyl, and substituted cycloalkyl;

m is 1 when T is oxygen or sulfur, and 2 when T is nitrogen;

v is an integer from 2 to 100,000;

$R^1$ and $R^2$ are each independently selected from the group consisting of hydrogen, alkyl, substituted alkyl, alkenyl, substituted alkenyl, aryl, and substituted aryl;

$R^3$, $R^4$, and $R^5$ are each independently selected from the group consisting of hydrogen, alkyl, substituted alkyl, fluorinated alkyl, alkyl containing an acetal functionality, alkenyl, substituted alkenyl, aryl, and substituted aryl;

$R^{3'}$, $R^{4'}$, and $R^{5'}$ are each independently selected from the group consisting of hydrogen, alkyl, substituted alkyl, fluorinated alkyl, alkyl containing an acetal functionality, alkenyl, substituted alkenyl, aryl, substituted aryl, and free radically polymerizable groups, with the proviso that at least one $R^{3'}$, $R^{4'}$, and $R^{5'}$ is a free radically polymerizable group;

FG is a protected or non-protected functional group;

L is a residue of a difunctional linking agent, such as a $SiMe_2$ residue derived from the difunctional linking agent $SiMe_2Cl_2$;

L' is a residue of a multifunctional linking agent, such as a Si residue derived from the multifunctional linking agent $SiCl_4$; and z is an integer from 3 to 20.

The present invention provides numerous advantages over prior silicon polymers and processes for making the same. For example, the anionic polymerization processes of the invention can provide improved control of polymer molecular distribution (typically less than about 1.5) and fewer byproducts. In addition, polymers of the invention which include two or more polymer arms or branches can include arms of varying monomer composition, length and molecular weight.

As used herein, the term "alkyl" refers to straight chain and branched C1–C25 alkyl. The term "substituted alkyl" refers to C1–C25 alkyl substituted with one or more lower C1–C10 alkyl, lower alkoxy, lower alkylthio, or lower dialkylamino. The term "cycloalkyl" refers to C3–C12 cycloalkyl. The term "substituted cycloalkyl" refers to C3–C12 cycloalkyl substituted with one or more lower C1–C10 alkyl, lower alkoxy, lower alkylthio, or lower dialkylamino. The term "aryl" refers to C5–C25 aryl having one or more aromatic rings, each of 5 or 6 carbon atoms. Multiple aryl rings may be fused, as in naphthyl or unfused, as in biphenyl. The term "substituted aryl" refers to C5–C25 aryl substituted with one or more lower C1–C10 alkyl, lower alkoxy, lower alkylthio, or lower dialkylamino. Exemplary aryl and substituted aryl groups include, for example, phenyl, benzyl, and the like. The term "alkenyl" refers to C2–C20 alkenyl and the term "substituted alkenyl" refers to C2–C20 alkenyl substituted with one or more lower C1–C10 alkyl, lower alkoxy, lower alkylthio, or lower dialkylamino. The term "free radically polymerizable group" refers to ethylenically unsaturated groupings, such as an omega-acrylate or methacrylate substituted alkyl groups (such as 3-(methacryloxy)propyl), alkenyl substituted aromatic compounds (such as 4-vinylphenyl), and the like.

Novel protected, functionalized silicone polymers of the present invention can be prepared as described in detail below.

Silicone polymer anions can be prepared by anionically polymerizing one or more cyclic siloxane monomers $(R^1R^2SiO)_y$, wherein $R^1$ and $R^2$ are as defined above and y is an integer from 3 to 10, in an inert solvent, optionally containing a polymerization promoter, at a temperature ranging from about −30° C. to about 250° C., for a period of at least one hour, with one or more protected functionalized initiators having the formula:

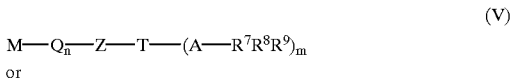

or

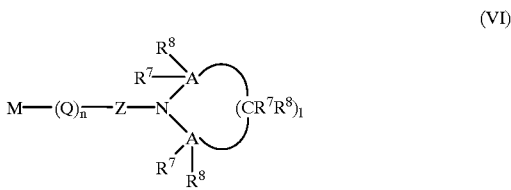

wherein:

M is an alkali metal selected from the group consisting of lithium, sodium and potassium;

Q is an unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—Z linkage;

n is an integer from 0 to 5;

Z is a branched or straight chain hydrocarbon connecting group which contains 3–25 carbon atoms, optionally substituted with aryl or substituted aryl;

T is selected from the group consisting of oxygen, sulfuir, nitrogen groups, and mixtures thereof;

$(A-R^7R^8R^9)_m$ is a protecting group in which A is an element selected from Group IVa of the Periodic Table of the Elements; $R^7$, $R^8$, and $R^9$ are each independently selected from the group consisting of hydrogen, alkyl, substituted alkyl, aryl, substituted aryl, cycloalkyl, and substituted cycloalkyl; and m is 1 when T is oxygen or sulfur, and 2 when T is nitrogen;

l is an integer from 1 to 7, to produce one or more living silicon polymer anions.

Protonation of a silicone polymer anion with a suitable protonating agent known in the art, for example acetic acid, affords a protected polymer (I):

Capping of a silicone polymer anion with one or more silicon halides or alkoxides of the formula ($R^3R^4R^5$—Si—X), wherein $R^3$, $R^4$ and $R^5$ are as defined above and X is halogen or C1–C20 alkoxide, affords a protected polymer (II):

Capping of a silicone polymer anion with one or more silicon halides or alkoxides having at least one free radically polymerizable group as a substituent on the silicon atom, such as compounds of the formula ($R^{3'}R^{4'}R^{5'}$—Si—X), wherein $R^{3'}$, $R^{4'}$ and $R^{5'}$ are as defined above and X is halogen or C1–C20 alkoxide, affords a protected functionalized macromonomer (II'):

Coupling living polymer anions with one or more difunctional coupling agents, for example, $Me_2SiCl_2$, affords a protected homotelechelic polymer (III):

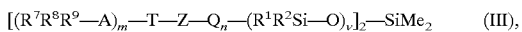

in which each —T—(A—R$^7$R$^8$R$^9$)$_m$ is the same or, alternatively, a protected heterotelechelic polymer of formula (III'):

$$[(R^7R^8R^9—A)_m—T—Z—Q_n—(R^1R^2Si—O)_v]_2—L \qquad (III')$$

in which each —T—(A—R$^7$R$^8$R$^9$)$_m$ differs. As used herein, the term "heterotelechelic polymers" include polymers in which each functional group T differs and is similarly protected (i.e., each —(A—R$^7$R$^8$R$^9$)$_m$ is the same); each functional group T is the same and is dissimilarly protected (i.e., each —(A—R$^7$R$^8$R$^9$)$_m$ differs); or each functional group T differs and is dissimilarly protected. In this aspect of the invention, the heterotelechelic polymers can be produced by separately polymerizing siloxane monomers with different protected functional initiators as described above to produce different protected functionalized polymer anions and thereafter linking the different polymer anions using excess linking agent. As will be appreciated by the skilled artisan, the polymer branches can vary in monomer composition, molecular weight, length, and the like.

The living polymer anions can be functionalized using a functionalzing agent or electrophile or other material as known in the art to be useful for terminating or end capping living polymers to provide protected heterotelechelic polymers of formula (III"):

$$(R^7R^8R^9—A)_m—T—Z—Q_n—(R^1R^2Si—O)_v—FG \qquad (III'')$$

in which —T—(A—R$^7$R$^8$R$^9$)$_m$ and FG differ.

Coupling the living silicon polymer with one or more multifunctional coupling agents, for example SiCl$_4$, affords a protected radial polymer (IV):

$$[(R^7R^8R^9—A)_m—T—Z—Q_n—(R^1R^2Si—O)_v]_2—Si \qquad (IV).$$

In this regard, when a mixture of protected functionalized initiators of formula V and/or VI above are used, the resultant radial polymer can include arms in which each functional group T differs and is similarly protected; each functional group T is the same and is dissimilarly protected; or each functional group T differs and is dissimilarly protected. In addition, a mixture of functional and non-functional initiators (such as alkyllithium initiators) can also be used to produce radial silicone polymers having both functionalized and non-functional arms. The radial polymers can be also prepared by separately polymerizing siloxane monomers (using the same or different silicon monomers and/or initiators) to provide living anions, and thereafter linking the living polymer anions with a suitable linking agent. The resultant radial polymer can include arms or branches of varying monomer composition, protected functionality, protecting groups, lengths and molecular weights.

The methods of the invention can efficiently provide terminally protected silicone polymers. The nature of the protected functional groups or the heteroatom can be varied by merely changing the identity of the functional initiator. The number of terminal functional groups can be varied by merely selecting the appropriate terminating agent or coupling agent.

U.S. Pat. Nos. 5,496,940 and 5,527,753 disclose novel, tertiary amino initiators which are soluble in hydrocarbon solvents. These initiators, useful in practicing this invention, are derived from omega-tertiary-amino-1-haloalkanes of the following general structures:

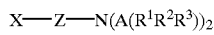

and

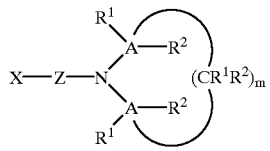

wherein: X is halogen, preferably chlorine or bromine; Z is a branched or straight chain hydrocarbon connecting group which contains 3–25 carbon atoms, optionally substituted with aryl or substituted aryl; A is an element selected from Group IVa of the Periodic Table of the Elements; R$^1$, R$^2$, and R$^3$ are each independently selected from the group consisting of hydrogen, alkyl, substituted alkyl, aryl, substituted aryl, cycloalkyl, and substituted cycloalkyl; and m is an integer from 1 to 7. The process reacts selected omega-tertiary-amino-1-haloalkanes whose alkyl groups contain 3 to 25 carbon atoms, with lithium metal at a temperature between about 35° C., and about 130° C., preferably at the reflux temperature of an alkane, cycloalkane, or aromatic reaction solvent containing 5 to 10 carbon atoms and mixtures of such solvents.

Tertiary amino-1-haloalkanes useful in the practice of this invention include, but are not limited to, 3-(N,N-dimethylamino)-1-propyl halide, 3-(N,N-dimethylamino)-2-methyl-1-propyl halide, 3-(N,N-dimethylamino)-2,2-dimethyl-1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-diethylamino)-2-methyl-1-propyl halide, 3-(N,N-diethylamino)-2,2-dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N-methylamino)-1-pentyl halide, 6-(N-ethyl-N-methylamino)-1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(2,2,5,5-tetramethyl-2,5-disila-1-azacyclopentane)-1-propyl halide, 4-(2,2,5,5-tetramethyl-2,5-disila-1-azacyclopentane)-1-butyl halide, 6-(2,2,5,5-tetramethyl-2,5-disila-1-azacyclopentane)-1-hexyl halide, 3-(N-isopropyl-N-methyl-1-propyl halide, 2-(N-isopropyl-N-methyl)-2-methyl-1-propyl halide, 3-(N-isopropyl-N-methyl)-2,2-dimethyl-1-propyl halide, and 4-(N-isopropyl-N-methyl)-1-butyl halide. The halo- or halide group preferably is chlorine or bromine.

U.S. Pat. No. 5,600,021 discloses novel monofunctional ether initiators which are soluble in hydrocarbon solvents.

These initiators, useful in practicing this invention, are derived from omega-protected-hydroxy-1-haloalkanes of the following general structure:

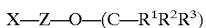

X—Z—O—(C—R¹R²R³)

wherein: X is halogen, preferably chlorine or bromine; Z is a branched or straight chain hydrocarbon connecting group which contains 3–25 carbon atoms, optionally substituted with aryl or substituted aryl; and $R^1$, $R^2$, and $R^3$ are each independently selected from the group consisting of hydrogen, alkyl, substituted alkyl, aryl, substituted aryl, cycloalkyl, and substituted cycloalkyl. The process reacts selected omega-hydroxy-protected-1-haloalkanes whose alkyl groups contain 3 to 25 carbon atoms, with lithium metal at a temperature between about 35° C. and about 130° C., preferably at the reflux temperature of an alkane, cycloalkane, or aromatic reaction solvent containing 5 to 10 carbon atoms and mixtures of such solvents.

The precursor omega-protected-1-haloalkanes (halides) were prepared from the corresponding haloalcohol by the standard literature methods. For example, 3-(1,1-dimethylethoxy)-1-chloropropane was synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X. Franck and A. Cave, Tetrahedron Letters, 34, 1993, 5893, which involved the reaction of the appropriate alcohol with 2-methyl-2-butene catalyzed by boron trifluoride etherate is employed for the preparation of the t-amyl ethers. The alkoxy, alkylthio or dialkylamino substituted ethers, for example 6-[3-(methylthio)-1-propyloxy]-1-chlorohexane, were synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, were synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, are prepared by the reaction of the haloalcohol with triphenylmethylchloride, according to the method of S. K. Chaudhary and O. Hernandez, Tetrahedron Letters, 1979, 95.

Omega-hydroxy-protected-1-haloalkanes useful in practicing this invention include, but are not limited to, 3-(1,1-dimethylethoxy)-1-propyl halide, 3-(1,1-dimethylethoxy)-2-methyl-1-propyl halide, 3-(1,1-dimethylethoxy)-2,2-dimethyl-1-propyl halide, 4-(1,1-dimethylethoxy)-1-butyl halide, 5-(1,1-dimethylethoxy)-1-pentyl halide, 6-(1,1-dimethylethoxy)-1-hexyl halide, 8-(1,1-dimethylethoxy)-1-octyl halide, 3-(1,1-dimethylpropoxy)-1-propyl halide, 3-(1,1-dimethylpropoxy)-2-methyl-1-propyl halide, 3-(1,1-dimethylpropoxy)-2,2-diemthyl-1-propyl halide, 4-(1,1-dimethylpropoxy)-1-butyl halide, 5-(1,1-dimethylpropoxy)-1-pentyl halide, 6-(1,1-dimethylpropoxy)-1-hexyl halide, 8-(1,1-dimethylpropoxy)-1-octyl halide, 4-(methoxy)-1-butyl halide, 4-(ethoxy)-1-butyl halide, 4-(propyloxy)-1-butyl halide, 4-(1-methylethoxy)-1-butyl halide, 3-(triphenylmethoxy)-2,2-dimethyl-1-propyl halide, 4-(triphenylmethoxy)-1-butyl halide, 3-[3-(dimethylamino)-1-propyloxy]-1-propyl halide, 3-[2-(dimethylamino)-1-ethoxy]-1-propyl halide, 3-[2-(diethylamino)-1-ethoxy]-1-propyl halide, 3-[2-(diisopropyl)amino]-1-ethoxy]-1-propyl halide, 3-[2-(1-piperidino)-1-ethoxy]-1-propyl halide, 3-[2-(1-pyrrolidino)-1-ethoxy]-1-propyl halide, 4-[3-(dimethylamino)-1-propyloxy]-1-butyl halide, 6-[2-(1-piperidino)-1-ethoxy]-1-hexyl halide, 3-[2-(methoxy)-1-ethoxy]-1-propyl halide, 3-[2-(ethoxy)-1-ethoxy]-1-propyl halide, 4-[2-(methoxy)-1-ethoxy]-1-butyl halide, 5-[2-(ethoxy)-1-ethoxy]-1-pentyl halide, 3-[3-(methylthio)-1-propyloxy]-1-propyl halide, 3-[4-(methylthio)-1-butyloxy]-1-propyl halide, 3-(methylthiomethoxy)-1-propyl halide, 6-[3-(methylthio)-1-propyloxy]-1-hexyl halide, 3-[4-(methoxy)-benzyloxy]-1-propyl halide, 3-[4-(1,1-dimethylethoxy)-benzyloxy]-1-propyl halide, 3-[2,4-(dimethoxy)-benzyloxy]-1-propyl halide, 8-[4-(methoxy)-benzyloxy]-1-octyl halide, 4-[4-(methylthio)-benzyloxy]-1-butyl halide, 3-[4-(dimethylamino)-benzyloxy]-1-propyl halide, 6-[4-(dimethylamino)-benzyloxy]-1-hexyl halide, 5-(triphenylmethoxy)-1-pentyl halide, 6-(triphenylmethoxy)-1-hexyl halide, and 8-(triphenylmethoxy)-1-octyl halide. The halo- or halide group is preferably chlorine or bromine.

U.S. Pat. No. 5,362,699 discloses novel monofinctional silyl ether initiators which are soluble in hydrocarbon solvents. These initiators, useful in practicing this invention, are derived from omega-silyl-protected-hydroxy-1-haloalkanes of the following general structure:

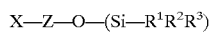

X—Z—O—(Si—R¹R²R³)

wherein: X is halogen, preferably chlorine or bromine; Z is a branched or straight chain hydrocarbon group which contains 3–25 carbon atoms, optionally substituted with aryl or substituted aryl; and $R^1$, $R^2$, and $R^3$ are independently defined as saturated and unsaturated aliphatic and aromatic radicals, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 25° C. and about 40° C., in an alkane, cycloalkane or aromatic reaction solvent containing 5 to 10 carbon atoms and mixtures of such solvents.

t-Butyldimethylsilyl protected compounds, for example 4-(t-butyldimethylsilyloxy)-1-butylhalide, are prepared from t-butyldimethylchlorosilane, and the corresponding halo-alcohol, according to the method described in U.S. Pat. No. 5,493,044. Omega-silyloxy-1-haloalkanes prepared in accord with this earlier process useful in practicing this invention include, but are not limited to, 3-(t-butyldimethylsilyloxy)-1-propyl halide, 3-(t-butyldimethylsilyloxy)-2-methyl-1-propyl halide, 3-(t-butyldimethylsilyloxy)-2,2-dimethyl-1-propyl halide, 4-(t-butyldimethylsilyloxy)-1-butyl halide, 5-(t-butyldimethylsilyloxy)-1-pentyl halide, 6-(t-butyldimethylsilyloxy)-1-hexyl halide, 8-(t-butyldimethylsilyloxy)-1-octyl halide, 3-(t-butyldiphenylylsilyloxy)-1-propyl halide, 3-(t-butyldiphenylylsilyloxy)-2-methyl-1-propyl halide, 3-(t-butyldiphenylylsilyloxy)-2,2-dimethyl-1-propyl halide, 6-(t-butyldimethylsilyloxy)-1-hexyl halide, and 3-(trimethylsilyloxy)-2,2-dimethyl-1-propyl halide. The halo- or halide group is preferably chlorine or bromine.

Monofunctional thioether initiators useful in the practice of this invention are derived from omega-protected-thio-1-haloalkanes of the following general structure:

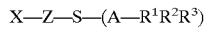

X—Z—S—(A—R¹R²R³)

wherein: X is halogen, preferably chlorine or bromine; Z is a branched or straight chain hydrocarbon group which contains 3–25 carbon atoms, optionally substituted with aryl or substituted aryl; (A—$R^1R^2R^3$) is a protecting group in which A is an element selected from Group IVa of the Periodic Table of the Elements; $R^1$, $R^2$, and $R^3$ are each independently selected from the group consisting of hydrogen, alkyl, substituted alkyl, aryl, substituted aryl, cycloalkyl, and substituted cycloalkyl. The process reacts selected omega-thioprotected-1-haloalkyls whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

The initiator precursor, omega-thio-protected-1-haloalkanes (halides), are prepared from the corresponding halothiol by the standard literature methods. For example, 3-(1,1-dimethylethylthio)-1-propylchloride is synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylethylthiol with 1-bromo-3-chloropropane and a base affords 3-(1,1-dimethylethylthio)-1-propylchloride. The method of B. Figadere, X. Franck and A. Cave, Tetrahedron Letters, 34, 1993, 5893, which involved the reaction of the appropriate thiol with 2-methyl-2-butene catalyzed by boron trifluoride etherate is employed for the preparation of the t-amyl thioethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chloride, as taught by D. F. Taber and Y. Wang, J. Org, Chem., 58, 1993, 6470. Methoxymethylthio compounds, such as 6-(methoxymethylthio)-1-hexylchloride, are prepared by the reaction of the omega-chloro-thiol with bromochloromethane, methanol, and potassium hydroxide, by the method of F. D. Toste and I. W. J. Still, Synlett, 1995, 159. t-Butyldimethylsilyl protected compounds, for example 4-(t-butyldimethylsilylthio)-1-butylhalide, are prepared from t-butyldimethylchlorosilane, and the corresponding thiol, according to the method described in U.S. Pat. No. 5,493,044.

Omega-thio-protected 1-haloalkanes prepared in accord with this earlier process useful in practicing this invention include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3-(methoxymethylthio)-1-propylhalide, 3-(methoxymethylthio)-2-methyl-1-propylhalide, 3-(methoxymethylthio)-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1-dimethylethylthio)-1-hexylhalide, 8-(1,1-dimethylethylthio)-1-octylhalide, 3-(1,1-dimethylpropylthio)-1-propylhalide, 3-(1,1-dimethylpropylthio)-2-methyl-1-propylhalide, 3-(1,1-dimethylpropylthio)-2,2-dimethyl-1-propylhalide, 4-(1,1-dimethylpropylthio)-1-butylhalide, 5-(1,1-dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl-1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexylhalide, 8-(cyclopentylthio)-1-octylhalide, 3-(cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t-butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butylhalide, 6-(t-butyldimethylsilylthio)-1-hexylhalide and 3-(trimethylsilylthio)-2,2-dimethyl-1-propylhalide. The halo- or halide group is preferably chlorine or bromine.

The initiators of the formulae

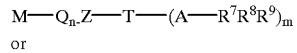
(V)

or

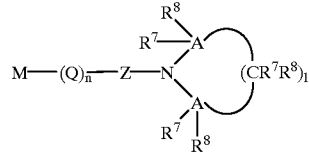
(VI)

are prepared by reacting a compound of the formula

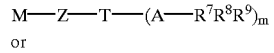
(VII)

or

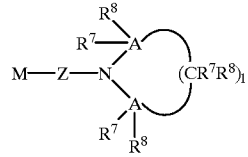
(VIII)

wherein M, Z, T, A, $R^7$, $R^8$, $R^9$, m and l have the meanings ascribed above, with one or more conjugated diene hydrocarbons, one or more alkenylsubstituted aromatic compounds, or mixtures of one or more dienes with one or more alkenylsubstituted aromatic compounds, to form an extended hydrocarbon chain between M and Z in formula (VII) and (VIII), which extended chain is denoted as $Q_n$ in formula (V) and (VI). The compounds of formula (VII) and (VIII) are prepared by first reacting in an inert solvent a selected tertiary amino-1-haloalkane or an omega-hydroxy-protected-1-haloalkane or an omega-thio-protected-1-haloalkane, depending on whether "T" is to be N, O or S (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional lithium initiator (of formula VII and VIII), which is then optionally reacted with one or more conjugated diene hydrocarbons, one or more alkenylsubstituted aromatic compounds, or mixtures of one or more dienes with one or more alkenylsubstituted aromatic compounds, in a predominantly alkane, cycloalkane, or aromatic reaction solvent, or mixture thereof, which solvent contains 5 to 10 carbon atoms, and mixtures of such solvents to produce a monofunctional initiator with an extended chain or tether between the metal atom (M) and element (T) in formula (V) and/or (VI) above and mixtures thereof with compounds of Formula (VII) and/or (VIII).

Thus, incorporation of Q groups into the M—Z linkage to form the compounds of formula (V) and (VI) above involves addition of compounds of the formula

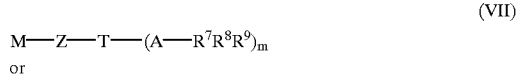

(VII)

or

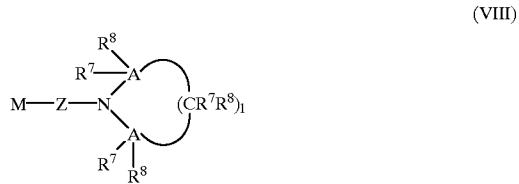

(VIII)

where the symbols have the meanings ascribed above, across the carbon to carbon double bonds in compounds selected from the group consisting of one or more conjugated diene hydrocarbons, one or more alkenylsubstituted aromatic compounds, or mixtures of one or more dienes with one or more alkenylsubstituted aromatic compounds to produce new carbon-lithium bonds of an allylic or benzylic nature, similar to those found in a propagating polyalkadiene or polyarylethylene polymer chain derived by anionic initiation of the polymerization of conjugated dienes or arylethylenes. These new carbon-lithium bonds are now "activated" toward polymerization and so are much more efficient in promoting polymerization than the precursor M—Z (M=Li) bonds, themselves.

Suitable conjugated dienes preferably contain from 4 to 12, more preferably from 4 to 8, carbon atoms per molecule. Examples of these compounds include without limitation 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and the like and mixtures thereof. Among the dialkylbutadienes, it is preferred that the alkyl groups contain from 1 to 3 carbon atoms.

Suitable alkenylsubstituted aromatic compounds include without limitation styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methylhexene-1 and the like and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include without limitation 3-methylstyrene, 3,5-diethylstyrene, 4-(tert-butyl)-styrene, 2-ethyl-4-benzylstyrene, 4-phenylstyrene, 4-p-tolylstyrene, 2,4-divinyltoluene, 4,5-dimethyl-1-vinylnaphthalene, and the like and mixtures thereof. Reference is made to U.S. Pat. No. 3,377,404 for disclosures of additional vinyl-substituted aromatic compounds. Non-polymerizable alkenyl substituted aromatic compounds such as 1,1-diphenylethylene may also be used.

Examples of monomers $(R^1R^2SiO)_y$ include, but are not limited to, $(Me_2SiO)_3$, $(MeHSiO)_3$, $(Me_2SiO)_4$, $(Me_2SiO)_5$, $(MeHSiO)_4$, $(MeHSiO)_5$, $(Ph_2SiO)_3$, $(Ph_2SiO)_4$, $(Ph_2SiO)_5$, $(PhHSiO)_3$, $(PhHSiO)_4$, $(PhHSiO)_5$, $(vinylHSiO)_3$, $(vinylHSiO)_4$, $(vinylHSiO)_5$, $(vinylMeSiO)_3$, $(vinylMeSiO)_4$, $(vinylMeSiO)_5$, $(PhMeSiO)_3$, $(PhMeSiO)_4$, and $(PhMeSiO)_5$, and the like and mixtures thereof.

Examples of capping or terminating agents $(R^3R^4R^{5'}$—Si—X) useful for the preparation of functionalized macromonomers, include, but are not limited to, chloro-(3-methacryloxypropyl)dimethylsilane, (3-methacryloxypropyl)trimethoxysilane, chloro-(2-methacryloxyethyl)-dimethylsilane, chloro-(2-acryloxyethyl)dimethylsilane, chloro-dimethyl-4-vinylphenylsilane, and chlorodimethyl-2-vinylphenylsilane, epihalohydrins, such as epichlorohydrin, and the like and mixtures thereof.

Examples of capping or terminating agents $(R^3R^4R^5$—Si—X) include, but are not limited to, $Me_3Si$—Cl, t-Butyl$Me_2Si$—Cl, $Et_3Si$—Cl, $Me_2PhSi$—Cl, $Me_2vinylSi$—Cl, $Et_3Si$—OMe, $Et_3Si$—OEt, 1H,1H,2H,2H-perfluorodecyldimethyl-chlorosilane (see U.S. Pat. No. 5,486,568), $CH_3CH_2OCHCH_3OCH_2CH_2CH_2SiMe_2OPh$ (see U.S. Pat. No. 5,478,899), $Me_3Si$—Br, $Me_2vinylSi$—OMe and $Me_2PhSi$—OMe, and the like and mixtures thereof.

Examples of difunctional coupling agents useful to form protected telechelic silicone polymers include, but are not limited to, $Me_2SiCl_2$, $Me_2Si(OMe)_2$, $Me_2SnCl_2$, $Ph_2SiCl_2$, $MePhSiCl_2$, $ClMe_2SiCH_2CH_2SiMe_2Cl$, and $Me_2SiBr_2$, and the like and mixtures thereof.

Examples of multifunctional coupling agents include, but are not limited to, $SiCl_4$, $SnCl_4$, $MeSiCl_3$, $HSi(OMe)_3$, $Si(OEt)_4$, and $Cl_3SiSiCl_3$, and the like and mixtures thereof.

Examples of polymerization promoters include, but are not limited to, tetrahydrofuran (THF), N,N,N',N-tetramethylethylene diamine (TMEDA), 1,2-dipipieridinoethane (DPE), dimethylsulfoxide (DMSO), N,N,N',N-tetraethylethylene diamine (TEEDA), and 1,2-dimethoxyethane (DME), and the like and mixtures thereof.

Electrophiles that are useful in functionalzing the polymeric living anion include, but are not limited to, haloalkyltrialkoxysilanes, alkenylhalosilanes and omega-alkenylarylhalosilanes, such as chlorotrimethylsilane and styrenyldimethyl chlorosilane; allyl halides, such as allyl bromide and allyl chloride; epihalohydrins, such as epichlorohydrin, epibromohydrin, and epiiodohydrin, and other materials as known in the art to be useful for terminating or end capping silicon polymers. The functionalzing step can be conducted at temperatures ranging from about −30° C. to about 150° C.

Inert hydrocarbon solvents useful in practicing this invention include but are not limited to inert liquid alkanes, cycloalkanes and aromatic solvents and mixtures thereof. Exemplary alkanes and cycloalkanes include those containing five to 10 carbon atoms, such as pentane, hexane, cyclohexane, methylcyclohexane, heptane, methylcycloheptane, octane, decane and the like and mixtures thereof. Exemplary aryl solvents include those containing six to ten carbon atoms, such as toluene, ethylbenzene, p-xylene, m-xylene, o-xylene, n-propylbenzene, isopropylbenzene, n-butylbenzene, and the like and mixtures thereof.

Examples of methods to hydrogenate the chain extension of the polymers of this invention are described in U.S. Pat. Nos. 4,970,254, 5,166,277, 5,393,843 and 5,496,898. The hydrogenation of the functionalized polymer is conducted in situ, or in a suitable solvent, such as hexane, cyclohexane, or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is conducted until at least 90% of the aliphatic unsaturation has been saturated. The hydrogenated functional polymer is then recovered by conventional procedures, such as removal of the catalyst with aqueous acid wash, followed by solvent removal or precipitation of the polymer.

If desired, the protecting groups can be removed from the protected silicone polymers. For example, to remove tert-alkyl-protected groups, the protected polymer is mixed with Amberlyst® 15 ion exchange resin and heated at an elevated temperature, for example 150° C., until deprotection is complete. In addition, tert-alkyl-protected groups can also be removed by reaction of the silicone polymer with trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41. The tert-butyldimethylsilyl protecting groups can be removed by treatment of the silicone polymer with acid, such as hydrochloric acid, acetic acid, paratoluenesulfonic acid, or Dowex® 50W-X8. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83.

The following table details experimental conditions that will selectively remove one of the protecting groups (more labile) from the polymer, while retaining the other protecting group (more stable).

| LABILE | STABLE | CONDITIONS |
| --- | --- | --- |
| t-Butyldimethylsilyl | Acetal | Tetrabutylammonium fluoride |
| t-Butyldimethylsilyl | Ketal | Tetrabutylammonium fluoride |
| t-Butyldimethylsilyl | Orthoester | Tetrabutylammonium fluoride |
| t-Butyldimethylsilyl | Aminal | Tetrabutylammonium fluoride |
| Acetal | t-Butyl | 1 N HCl |
| Ketal | t-Butyl | 1 N HCl |
| Orthoester | t-Butyl | 1 N HCl |
| Aminal | t-Butyl | 1 N HCl |
| Acetal | Dialkylamino | 1 N HCl |
| Ketal | Dialkylamino | 1 N HCl |
| Orthoester | Dialkylamino | 1 N HCl |
| Aminal | Dialkylamino | 1 N HCl |
| 2,2,5,5-Tetramethyl-2,5-disila-1-azacyclopentane | Acetal | Tetrabutylammonium Fluoride |
| 2,2,5,5-Tetramethyl-2,5-disila-1-azacyclopentane | Ketal | Tetrabutylammonium Fluoride |
| 2,2,5,5-Tetramethyl-2,5-disila-1-azacyclopentane | Orthoester | Tetrabutylammonium Fluoride |
| 2,2,5,5-Tetramethyl-2,5-disila-1-azacyclopentane | Aminal | Tetrabutylammonium Fluoride |

Deprotection of polymer (I) affords a functionalized silicone polymer with the structure:

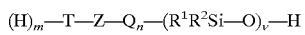

wherein T, Z, Q, $R^1$, $R^2$, m, n, and v are as defined above.

Deprotection of polymer (II) affords a functionalized silicone polymer with the structure:

wherein T, Z, Q, $R^1$, $R^2$, $R^3$, $R^4$, $R^5$, m, n and v are as defined above.

Deprotection of polymer (II') affords a functionalized silicone macromonomer with the structure:

wherein T, Z, Q, $R^1$, $R^2$, $R^{3'}$, $R^{4'}$, $R^{5'}$, m, n and v are as defined above.

Deprotection of (III) affords the homotelechelic silicone polymer with the following structure:

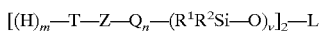

wherein T, Z, Q, $R^1$, $R^2$, m, n, v and L are as defined above.

Deprotection of (III') affords the heterotelechelic silicone polymer with the following structure:

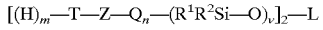

wherein T, Z, Q, $R^1$, $R^2$, m, n, v and L are as defined above. In this regard, after deprotection, to still be considered a heterotelechelic polymer, each T fuuctional group is different. As the skilled artisan will appreciate, a heterotelechelic polymer (III') having different protecting groups can be selectively deprotected to remove one but not the other of the protecting groups. This allows the ability to perform additional chemistries at the liberated functional groups (such as copolymerization to form polymer segments or modification of the functional groups to a different functionality, as described in more detail below), followed optionally by deprotection and additional chemistries of the remaining protected functional group.

Deprotection of (III") affords the heterotelechelic silicone polymer with the following structure:

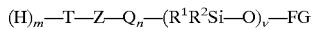

wherein T, Z, Q, $R^1$, $R^2$, m, n, v and FG are as defined above. Protecting groups of the functionality T and the functional group FG can also be selectively removed by proper selection of deprotecting reagents and conditions.

Deprotection of the radial polymer (IV) affords the terminally functionalized radial polymer with the following structure:

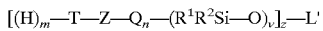

wherein T, W, Q, $R^1$, $R^2$, m, n, v, z, and L' are as defined above. Similar to the heterotelechelic polymers, for radial polymers having differently protected functional groups T, the functional groups can be selectively deprotected to remove one but not the other of the protecting groups, additional chemistries performed at the liberated functional groups, followed optionally by deprotection and additional chemistries of the remaining protected functional groups.

As discussed above, the polymers of the invention can be deprotected, and the polymers can optionally be reacted with one or more comonomers to polymerize a functional end thereof. Protecting groups can be removed simultaneously or sequentially. For example, the polymers can be reacted with one or more comonomers in the presence of a strong acid catalyst to simultaneously deprotect the functional polymer and polymerize the functional end thereof to produce novel segmented block polymers. Alternatively, the functional groups can be selectively deprotected to remove one but not the other of the protecting groups, additional chemistries performed at the liberated functional groups, followed optionally by deprotection and additional chemistries of the remaining protected functional groups.

Exemplary comonomers include without limitation cyclic ethers, diamines, diisocyanates, polyisocyanates, di-, poly- and cyclic amides, di- and polycarboxylic acids, diols, polyols, anhydrides, and the like and mixtures thereof For example, functionalized polymers can be further reacted with monofunctional monomers, such as caprolactam, or other lactams, to form a polyamide block polymer segment, or cyclic ethers such ethylene oxide to form polyether blocks; or with difunctional monomers, such as diacids or anhydrides and diamines to form polyamide blocks, or diacids or anhydrides or lactones and diols to form polyester blocks, or diols and polyols with diisocyanates or polyisocyanates to form polyurethane blocks. Polyisocyanates or polyfunctional polyols are examples of polyfunctional monomers. The functional group may also be reacted with a suitable agent containing a reactive olefinic bond, such as a styrenic or acrylic functionality, such as methacroyl chloride, which will act to change the nature of the functionality and provide a "macromonomer" capable of polymerizing with other free radically polymerizable monomers.

The silicone polymers and process of the present invention can provide many advantages. For example, various terminal heteroatoms can be introduced by changing the nature of the initiator. Different protecting groups can be employed to mask the heteroatoms. Hydroxy terminated telechelic silicone polymers are more stable than previous polymers. The different protecting groups can be selectively removed, if desired, and the newly liberated functional group can be further derivatized or copolymerized.

The present invention will be further illustrated by the following non-limiting examples.

EXAMPLE 1

Preparation of Alpha-[3-(t-Butoxy)propyl]-Omega-Hydroxy-Poly(dimethylsiloxane)

A 250 ml glass reactor is equipped with three break-seal reagent ampoules, a sampling port attached with a Teflon stopcock, an inlet tube fitted with a septum cap, and a magnetic stir bar. This reactor is flame sealed to a high vacuum line, and evacuated at 120° C. for 8 hours. The flask is refilled with dry argon and allowed to cool to room temperature. 3-(1,1-Dimethylethoxy)-1-propyllithium (chain extended with two equivalents of isoprene) 16.0 wt. % in cyclohexane, 0.488 grams (1.89 mmoles) is added to the reactor with a syringe via the inlet tube. Cyclohexane, 100 ml, is then vacuum distilled directly into the reactor. The flask is then removed from the vacuum line by a flame seal. The monomer, sublimed hexamethylcyclotrisiloxane, 15.0 grams (67.4 mmole), is dissolved in cyclohexane (20 ml) and this solution is added from one of the ampoules. Dry tetrahydrofuran, 20 ml, is then added from another ampoule.

The reaction mixture is placed in a constant temperature bath at 40° C. After eight hours, the conversion is about 90%. The polymerization reaction is terminated with degassed methanol, added from the last break-seal ampoule. The functionalized polymer is recovered by precipitation two times into methanol, and vacuum dried for twenty four hours.

The resultant functionalized silicone polymer is characterized by $^1$H NMR and SEC, and has the following properties:

$M_n=7.3\times10^3$ g/mole $M_w=7.6\times10^3$ g/mole $M_w/M_n=1.04$

The $^1$H NMR spectrum exhibits a peak at 1.17 ppm for the t-butoxy group. No cyclic oligomer was detected by SEC analysis.

EXAMPLE 2

Preparation of Alpha-[(3-Hydroxy)propyl]-Omega-Hydroxy-Poly(dimethylsiloxane)

A 100 ml flask is fitted with a magnetic stir bar, a reflux condenser, and a nitrogen inlet. This apparatus is dried in an oven overnight at 125° C., assembled hot and allowed to cool in a stream of nitrogen. The t-butoxypropyl functionalized silicone polymer prepared in Example 1 (1.00 gram), toluene (10 ml) and Amberlyst® 15 resin (0.50 grams) are added to the flask. The reaction mixture is heated to reflux. The progress of the reaction is monitored by TLC. Once all the starting material is consumed, the reaction mixture is allowed to cool to room temperature. The Amberlyst® 15 resin is removed by filtration. After solvent removal and vacuum drying, the resultant polymer is analyzed by $^1$H NMR. The peak from the t-butoxy group is completely absent (1.17 ppm).

EXAMPLE 3

Preparation of Alpha-[3-(2,2,5,5-Tetramethyl-2,5-Disila-1-Azacyclopentane)-propyl]-Omega-(3-Methacyloxylropy)-dimethylsilyl-Polyfmethylsiloxane)

A 250 ml glass reactor is equipped with three break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(2,2,5,5-Tetramethyl-2,5-disila-1-azacyclopentane)-1-propyllithium, 12.0 wt. % in cyclohexane, 0.725 grams (3.5 mmoles) is added to the reactor with a syringe via the inlet tube. Cyclohexane, 100 ml, is then vacuum distilled directly into the reactor. The flask is then removed from the vacuum line by a flame seal. The monomer, methylcyclotrisiloxane, 42.0 grams (233 mmole), is dissolved in cyclohexane (20 ml) and this solution is added from one of the ampoules. Dry tetrahydrofuran, 20 ml, is then added from another ampoule. The reaction mixture is then placed in a constant temperature bath at 40° C. After eight hours, the conversion is about 94%. The polymerization reaction is terminated with 3.09 grams (14 mmole) of chloro-(3-methacryloxypropyl)-dimethylsilane, added from the last break-seal ampoule. The functionalized polymer is recovered by precipitation two times into methanol, and is vacuum dried for twenty four hours.

The resultant functionalized silicone polymer is characterized by $^1$H NMR and SEC, and has the following properties:

$M_n$=1.20×10$^4$ g/mole $M_w$=1.25×10$^4$ g/mole $M_w/M_n$=1.04.

No cyclic oligomer is detected by SEC analysis. The NMR clearly exhibits the signals characteristic of the methacryl group.

EXAMPLE 4

Preparation of Alpha-Aminopropyl-Omega-(3-Methacryloxypropyl)-dimethylsilyl-Poly (methylsiloxane)

A 100 ml, flask is fitted with a magnetic stir bar, a reflux condenser, and a nitrogen inlet. This apparatus is dried in an oven overnight at 125° C., assembled hot, and allowed to cool in a stream of nitrogen. The protected amine functionalized silicone polymer, prepared in Example 3, (1.00 gram), tetrahydrofuran (10 ml) and 1N HCl (1 ml) are added to the flask. The reaction mixture is heated to reflux. The progress of the reaction is monitored by TLC, for disappearance of the starting material. Once all the starting material had been consumed, the reaction mixture is allowed to cool to room temperature. After solvent removal, the resultant polymer cement is precipitated into methanol and is vacuum dried.

The resultant functionalized silicone polymer is characterized by $^1$H NMR and SEC, and has the following properties:

$M_n$=1.20×10$^4$ g/mole $M_w$=1.25×10$^4$ g/mole $M_w$/Mn=1.04.

The NMR clearly exhibits the signals characteristic of the methacryl group.

EXAMPLE 5

Preparation of Alpha-[t-Butyldimethylsilyloxy) propyl]-Omega-Trimethylsilyl-Poly (methylphenylsiloxane)

A 250 ml glass reactor is equipped with three break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(t-Butyldimethylsilyloxy)-1-propyllithium 18.0 wt. % in cyclohexane, 0.811 grams (4.5 mmoles) is added to the reactor with a syringe via the inlet tube. Cyclohexane, 100 ml, is then vacuum distilled directly into the reactor. The flask is then removed from the vacuum line by a flame seal. The monomer, methylphenylcyclotrisiloxane, 45.0 grams (110 mmole), is dissolved in cyclohexane (20 ml) and this solution is added from one of the ampoules. Dry tetrahydrofuran, 20 ml, is then added from another ampoule. The reaction mixture is then placed in a constant temperature bath at 40° C. After eight hours, the conversion is about 88%. The polymerization reaction is terminated with 1.63 grams (15 mmole) of chlorotrimethylsilane, added from the last break-seal ampoule. The functionalized polymer is recovered by precipitation two times into methanol, and is vacuum dried for twenty four hours.

The resultant functionalized silicone polymer is characterized by $^1$H NMR and SEC, and has the following properties:

$M_n$=1.00×10$^4$ g/mole $M_w$=1.05×10$^4$ g/mole $M_w/M_n$=1.05.

The $^1$H NMR spectrum exhibits a peak at 0.88 ppm assigned to the t-butyldimethylsilyloxy group. No cyclic oligomer is detected by SEC analysis.

EXAMPLE 6

Preparation of Telechelic [3-(t-Butoxy)propyl]-Poly (dimethylsiloxane)

A 250 ml glass reactor is equipped with three break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(1,1-Dimethylethoxy)-1-propyllithium (chain extended with two equivalents of isoprene) 16.0 wt. % in cyclohexane, 0.488 grams (1.89 mmoles) is added to the reactor with a syringe via the inlet tube. Cyclohexane, 100 ml, is then vacuum distilled directly into the reactor. The flask is then removed from the vacuum line by a flame seal. The monomer, sublimed hexamethylcyclotrisiloxane, 15.0 grams (67.4 mmole), is dissolved in cyclohexane (20 ml) and this solution is added from one of the ampoules. Dry tetrahydrofuran, 20 ml, is then added from another ampoule. The reaction mixture is then placed in a constant temperature bath at 40° C. After eight hours, the conversion is about 90%. The polymerization reaction is terminated with 0.77 grams (6 mmole) of dichlorodimethylsilane, added from the last break-seal ampoule. The functionalized polymer is recovered by precipitation two times into methanol, and vacuum dried for twenty four hours.

The resultant telechelic functionalized silicone polymer is characterized by $^1$H NMR and SEC, and has the following properties:

$M_n$=1.46×10$^4$ g/mole $M_w$=1.52×10$^4$ g/mole $M_w/M$=1.04.

The $^1$H NMR spectrum exhibits a peak at 1.17 ppm for the t-butoxy group. No cyclic oligomer is detected by SEC analysis.

EXAMPLE 7

Preparation of Terminal [3-(t-Butyldimethylsilyloxy) propyl]-Poly (dimethylsiloxane) Star A 250 ml glass reactor is equipped with three break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(t-Butyldimethylsilyloxy)-1-propyllithium 18.0 wt. % in cyclohexane, 0.90 grams (5 mmoles) is added to the reactor with a syringe via the inlet tube. Cyclohexane, 100 ml, is then vacuum distilled directly into the reactor. The flask is then removed from the vacuum line by a flame seal. The monomer, sublimed hexamethylcyclotrisiloxane, 50.0 grams (225 mmole), is dissolved in cyclohexane (20 ml) and this solution is added from one of the ampoules. Dry tetrahydrofuran, 20 ml, is then added from another ampoule. The reaction mixture is then placed in a constant temperature bath at 40° C. After eight hours, the conversion is about 90%. An aliquot is withdrawn with a syringe, and quenched with degassed methanol. This sample is analyzed by SEC to characterize the silicone base polymer. The polymerization reaction is terminated with 2.55 grams (15 mmole) of tetrachlorosilane, added from the last break-seal ampoule. The functionalized polymer is recovered by precipitation two times into methanol, and vacuum dried for twenty four hours.

The resultant functionalized base polymer is characterized by SEC, and has the following properties:

$M_n = 1 \times 10^4$ g/mole
$M_w$ 1.03×104 g/mole
$M_w/M_n = 1.03$.

The resultant functionalized star polymer is fully characterized by $^1$H NMR and SEC, and has the following properties:

$M_n = 4.1 \times 10^4$ g/mole
$M_w = 4.3 \times 10^4$ g/mole
$M_w/M_n = 1.05$

The $^1$H NMR spectrum exhibits a peak at 0.88 ppm assigned to the t-butyldimethylsilyloxy group. No cyclic oligomer is detected by SEC analysis.

The foregoing examples are illustrative of the present invention and are not to be construed as limiting thereof. The invention is defined by the following claims, with equivalents of the claims to be included therein.

That which is claimed is:

1. A protected functionalized silicone polymer comprising a compound selected from the group consisting of:

protected functionalized polymers of the formula

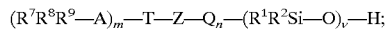
$(R^7R^8R^9—A)_m—T—Z—Q_n—(R^1R^2Si—O)_v—H$;

protected functionalized polymers of the formula

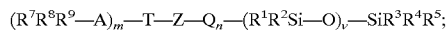
$(R^7R^8R^9—A)_m—T—Z—Q_n—(R^1R^2Si—O)_v—SiR^3R^4R^5$;

protected functionalized macromonomers of the formula

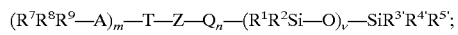
$(R^7R^8R^9—A)_m—T—Z—Q_n—(R^1R^2Si—O)_v—SiR^{3'}R^{4'}R^{5'}$;

protected functionalized homotelechelic polymers of the formula

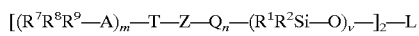
$[(R^7R^8R^9—A)_m—T—Z—Q_n—(R^1R^2Si—O)_v—]_2—L$ in which each $T—(A—R^7R^8R^9)_m$ is the same;

protected functionalized heterotelechelic polymers of the formula

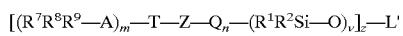
$[(R^7R^8R^9—A)_m—T—Z—Q_n—(R^1R^2Si—O)_v]_2—L'$ in which each $T—(A—R^7R^1R^9)_m$ is different;

protected functionalized heterotelechelic polymers of the formula

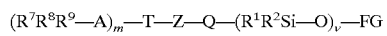
$(R^7R^8R^9—A)_m—T—Z—Q—(R^1R^2Si—O)_v—FG$ in which FG and $T—(A—R^7R^8R^9)_m$ differ; and protected functionalized radial polymers of the formula

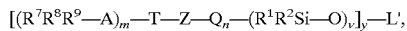
$[(R^7R^8R^9—A)_m—T—Z—Q_n—(R^1R^2Si—O)_v]_y—L'$, wherein:

Q is an unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—Z linkage;

n is an integer from 0 to 5;

Z is a branched or straight chain hydrocarbon connecting group which contains 3–25 carbon atoms, optionally substituted with aryl or substituted aryl;

T is selected from the group consisting of oxygen, sulfur, and nitrogen groups, and mixtures thereof;

$(A—R^7R^8R^9)_m$ is a protecting group in which A is an element selected from Group IVa of the Periodic Table of the Elements; $R^7$, $R^8$, and $R^9$ are each independently selected from the group consisting of hydrogen, alkyl, substituted alkyl, aryl, substituted aryl, cycloalkyl, and substituted cycloalkyl or optionally $R^9$ is $—(CR^7R^8)_l$ linking two A, wherein each $R^7$ and $R^8$ is the same as defined above and l is an integer from 1 to 7; and m is 1 when T is oxygen or sulfur, and 2 when T is nitrogen;

$R^1$ and $R^2$ are each independently selected from the group consisting of hydrogen, alkyl, substituted alkyl, alkenyl, substituted alkenyl, aryl, and substituted aryl;

v is an integer from 2 to 100,000;

$R^3$, $R^4$, and $R^5$ are each independently selected from the group consisting of hydrogen, alkyl, substituted alkyl, fluorinated alkyl, alkyl containing an acetal functionality, alkenyl, substituted alkenyl, aryl, and substituted aryl;

$R^{3'}$, $R^{4'}$, and $R^{5'}$ are each independently selected from the group consisting of hydrogen, alkyl, substituted alkyl, fluorinated alkyl, alkyl containing an acetal functionality, alkenyl, substituted alkenyl, aryl, substituted aryl, and a free radically polymerizable group, with the proviso that at least one of $R^{3'}$, $R^{4'}$, and $R^{5'}$ is a free radically polymerizable group;

FG is a protected or non-protected functional group derived by incorporation of an electrophile capable of functionalizing a living silicone polymer;

L is a residue derived by incorporation of a difunctional linking group;

L' is a residue derived by incorporation of a multifunctional linking group; and z is an integer from 3 to 20.

2. The protected functionalized silicone polymer of claim 1, wherein said polymer comprises a compound of the formula

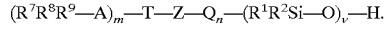
$(R^7R^8R^9—A)_m—T—Z—Q_n—(R^1R^2Si—O)_v—H$.

3. The protected functionalized silicone polymer of claim 1, wherein said polymer comprises a compound of the formula

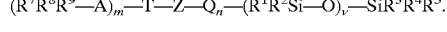
$(R^7R^8R^9—A)_m—T—Z—Q_n—(R^1R^2Si—O)_v—SiR^3R^4R^5$.

4. The protected functionalized polymer of claim 1, wherein said polymer comprises a macromonomer of the formula

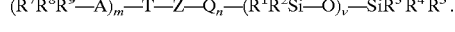
$(R^7R^8R^9—A)_m—T—Z—Q_n—(R^1R^2Si—O)_v—SiR^{3'}R^{4'}R^{5'}$.

5. The macromonomer of claim 4, wherein at least one of $R^{3'}$, $R^{4'}$, and $R^{5'}$ is selected from the group consisting of omega-acrylate or methacrylate substituted alkyl and alkenyl substituted aromatic compounds.

6. The protected functionalized silicone polymer of claim 1, wherein said polymer comprises a protected homotelechelic polymer of the formula

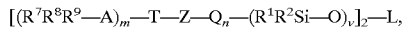

in which each $-(A-R^7R^8R^9)_m$ is the same.

7. The protected functionalized silicone polymer of claim 1, wherein said polymer comprises a protected heterotelechelic polymer of the formula

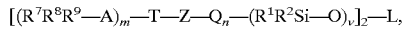

in which each $-T-(A-R^7R^8R^9)_m$ differs.

8. The protected functionalized silicone polymer of claim 1, wherein said polymer comprises a protected heterotelechelic polymer of the formula

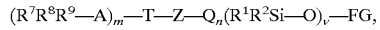

in which FG and $-(A-R^7R^8R^9)_m$ differs.

9. The protected functionalized silicone polymer of claim 1, wherein said polymer comprises a protected radial polymer of the formula

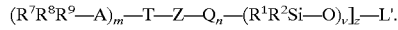

10. The protected functionalized silicone polymer of claim 1, wherein A is carbon.

11. The protected functionalized silicone polymer of claim 1, wherein A is silicon.

12. A process for the preparation of protected functionalized silicone polymers, comprising:

anionically polymerizing one or more cyclic siloxane monomers of the formula $(R^1R^2SiO)y$, wherein $R^1$ and $R^2$ are independently selected from the group consisting of hydrogen, alkyl, substituted alkyl, alkenyl, substituted alkenyl, aryl and substituted aryl and y is an integer from 3 to 10, in an inert solvent, optionally containing a polymerization promoter, at a temperature ranging from about −30° C. to about 250° C., for a period of at least one hour, with one or more protected functionalized initiators having the formula:

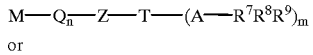
or
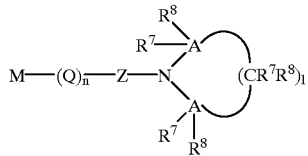

wherein:

M is an alkali metal selected from the group consisting of lithium, sodium and potassium;

Q is an unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—Z linkage;

n is an integer from 0 to 5;

Z is a branched or straight chain hydrocarbon connecting group which contains 3–25 carbon atoms, optionally substituted with aryl or substituted aryl;

T is selected from the group consisting of oxygen, sulfuir, and nitrogen groups, and mixtures thereof;

$(A-R^7R^8R^9)_m$ is a protecting group in which A is an element selected from Group IVa of the Periodic Table of the Elements; $R^7$, $R^8$, and $R^9$ are each independently selected from the group consisting of hydrogen, alkyl, substituted alkyl, aryl, substituted aryl, cycloalkyl, and substituted cycloalkyl or optionally $R^9$ is $-(CR^7R^8)_l$ linking two A, wherein each $R^7$ and $R^8$ is the same as defined above and l is an integer from 1 to 7; and m is 1 when T is oxygen or sulfur, and 2 when T is nitrogen; and l is an integer from 1 to 7, to produce one or more protected functionalized living silicon polymer anions; and reacting said living silicone polymer anion with a protonating, capping, functionalizing, or coupling agent suitable to provide a protected functionalized silicone polymer comprising a compound selected from the group consisting of:

protected functionalized polymers of the formula

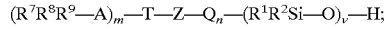

protected functionalized polymers of the formula

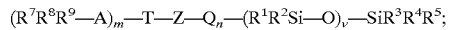

protected functionalized macromonomers of the formula

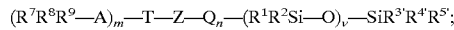

protected functionalized homotelechelic polymers of the formula

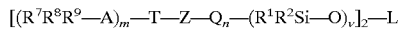

in which each $T-(A-R^7R^8R^9)_m$ is the same;

protected functionalized heterotelechelic polymers of the formula

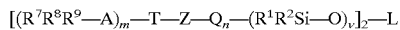

in which each $T-(A-R^7R^8R^9)_m$ is different;

protected functionalized heterotelechelic polymers of the formula

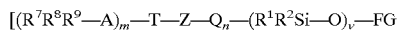

in which FG and $T-(A-R^7R^8R^9)_m$ is different; and protected functionalized radial polymers of the formula

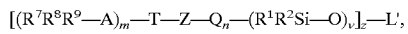

wherein:

Q, Z, T, A, $R^1$, $R^2$, $R^7$, $R^8$, $R^9$, m, and n have the meanings as defined above;

v is an integer from 2 to 100,000;

$R^3$, $R^4$, and $R^5$ are each independently selected from the group consisting of hydrogen, alkyl, substituted alkyl, fluorinated alkyl, alkyl containing an acetal functionality, alkenyl, substituted alkenyl, aryl, and substituted aryl;

$R^{3'}$, $R^{4'}$, and $R^{5'}$ are each independently selected from the group consisting of hydrogen, alkyl, substituted alkyl, fluorinated alkyl, alkyl containing an acetal, functionality alkenyl, substituted alkenyl, aryl, substituted aryl, and a free radically polymerizable group, with the proviso that at least one of $R^{3'}$, $R^{4'}$, and $R^{5'}$ is a free radically polymerizable group;

FG is protected or non-protected functional group derived by incorporation of an electrophile capable of functionalizing a living silicone polymer;

L is a residue derived from a difunctional linking group;

L' is residue derived from a multifunctional linking group; and z is an integer from 3 to 20.

13. The process of claim 12, wherein said agent is a protonating agent and wherein said protected functionalized polymer comprises a protected functionalized polymer of the formula

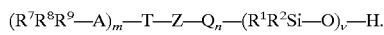
$(R^7R^8R^9—A)_m—T—Z—Q_n—(R^1R^2Si—O)_v—H.$

14. The process of claim 12, wherein said agent is a capping agent comprising a halide or alkoxide of the formula $(R^3R^4R^5—Si—X)$, wherein each $R^3$, $R^4$, and $R^5$ is as defined above and X is halide or alkoxide, and wherein said protected functionalized polymer comprises a protected functionalized polymer of the formula

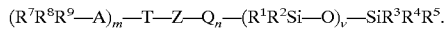
$(R^7R^8R^9—A)_m—T—Z—Q_n—(R^1R^2Si—O)_v—SiR^3R^4R^5.$

15. The process of claim 12, wherein said agent is a capping agent comprising a halide or alkoxide of the formula $(R^{7'}R^{8'}R^{9'}—Si—X)$, wherein each $R^{3'}$, $R^{4'}$, and $R^{5'}$ is as defined above and X is halide or alkoxide, and wherein said protected functionalized polymer comprises a protected functionalized macromonomer of the formula

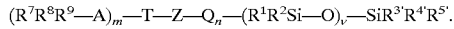
$(R^7R^8R^9—A)_m—T—Z—Q_n—(R^1R^2Si—O)_v—SiR^{3'}R^{4'}R^{5'}.$

16. The process of claim 15, wherein at least one of $R^{3'}$, $R^{4'}$, and $R^{5'}$ is selected from the group consisting of omega-acrylate or methacrylate substituted alkyl and alkenyl substituted aromatic compounds.

17. The process of claim 12, wherein said agent comprises a difunctional linking agent and wherein said protected functionalized polymer comprises a protected homotelechelic polymer of the formula

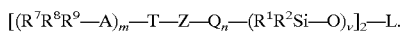
$[(R^7R^8R^9—A)_m—T—Z—Q_n—(R^1R^2Si—O)_v]_2—L.$

18. The process of claim 12, wherein said agent comprises a difunctional linking agent and wherein said protected functionalized polymer comprises a protected heterotelechelic polymer of the formula

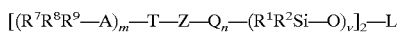
$[(R^7R^8R^9—A)_m—T—Z—Q_n—(R^1R^2Si—O)_v]_2—L$ in which each $T—(A—R^7R^8R^9)_m$ is different.

19. The process of claim 12, wherein said agent comprises a functionalizing agent and wherein said protected functionalized polymer comprises a protected heterotelechelic polymer of the formula

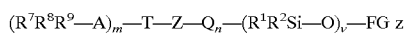
$(R^7R^8R^9—A)_m—T—Z—Q_n—(R^1R^2Si—O)_v—FG\ z$ in which FG and $T—(A—R^7R^8R^9)_m$ are different.

20. The process of claim 12, wherein said agent comprises a multifunctional linking agent and wherein said protected functionalized polymer comprises a protected radial polymer of the formula

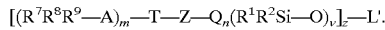
$[(R^7R^8R^9—A)_m—T—Z—Q_n(R^1R^2Si—O)_v]_z—L'.$

21. The process of claim 12, further comprising:

removing at least one protecting group $(A—R^7R^8R^9)_m$ to liberate at least one functional group T; and optionally reacting said liberated functional group T with one or more comonomers to produce a polymer segment.

22. The process of claim 21, wherein said removing step and said reacting step occur simultaneously.

23. The process of claim 12, further comprising:

removing at least one protecting group $(A—R^7R^8R^9)_m$ to liberate at least one functional group T; and optionally reacting said liberated functional group T under conditions sufficient to modify the functionality of T to incorporate a reactive olefinic bond.

24. The process of claim 12, further comprising the step of hydrogenating said polymer.

25. The protected functionalized silicone polymer of claims 1, wherein FG is a protected or non-protected functional group derived by incorporation of an electrophile selected from the group consisting of haloalkyltrialkoxysilanes, alkenylhalosilanes, omega-alkenylarylhalosilanes, allyl halides, and epihalohydrins.

26. The protected functionalized silicone polymer of claims 1, wherein n is 1 to 5.

27. A protected functionalized heterotelechelic silicon polymer of the formula

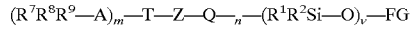
$(R^7R^8R^9—A)_m—T—Z—Q—_n—(R^1R^2Si—O)_v—FG$ and $T—(A—R^7R^8R^9)_m$ differ Q is an unsaturated hydrocarbyl group derived by incorporation of one or more conjugated diene hydrocarbons, one or more alkenylsubstituted aromatic compounds into the M—Z linkage;

n is an interger from 0 to 5;

Z is a branched or straight chain hydrocarbon connection group which contains 3–25 carbon atoms, optionally substituted with aryl or substituted aryl;

T is selected from the group consisting of oxygen, sulfur, and nitrogen groups, and mixtures thereof;

$(A—R^7R^8R^9)_m$ is a protecting group in which A is carbon; $R^7$, $R^8$, and $R^9$ are each independently selected from the group consisting of hydrogen, alkyl, substituted alkyl, aryl, substituted aryl, cycloalkyl, and substituted cycloalkyl or optionally $R^9$ is $—(CR^7R^8)_l$ linking two A, wherein each $R^7$ and $R^8$ is the same as defined above and l is an interger from 1 to 7; and m is 1 when T is oxygen or sulfur, and 2 when T is nitrogen;

$R^1$ amd $R^2$ are each independently selected from the group consisting of hydrogen, alkyl, substituted alkyl, alkenyl, substituted alkenyl, aryl, and substituted aryl;

v is an integer from 2 to 100,000; and

FG is a protected or non-protected functional group derived by incorporation of an electrophile capable of functionalizing a living silicone polymer.

28. The protected functionalized silicone polymer of claim 27, wherein FG is a protected or non-protected functional group derived by incorporation of an eletrophile selected from the group consisting of haloalkyltrialkoxysilanes, alkenylhalosilanes, omega-alkenylarylhalosilanes, allyl halides, and epihalohydrins.

29. The protected functionalized silicone polymer of claim 27, wherein n is 1 to 5.

30. The process of claim 12, wherein A is carbon.

31. The process of claim 12, wherein A is silicon.

32. The process of claim 12, wherein FG is a protected or non-protected functional group derived by incorporation of an electrophile selected from the group consisting of haloalkyltrialkoxysilanes, alkenylhalosilanes, omega-alkenylarylhalosilanes, allyl halides, and epihalohydrins.

33. The process of claim 12, wherein n is 1 to 5.

* * * * *

UNITED STATES PATENT AND TRADEMARK OFFICE
CERTIFICATE OF CORRECTION

PATENT NO. : 6,031,060
DATED : February 29, 2000
INVENTOR(S) : Letchford et al.

Page 1 of 2

It is certified that error appears in the above-identified patent and that said Letters Patent is hereby corrected as shown below:

Title page, [56] References Cited, OTHER PUBLICATIONS, line 5, before "Chemistry" insert --Organic--.

Column 21, line 59, "$]_z$-L'" should read --$]_2$-L--; line 61, "$R^{1'}$" should read --$R^8$--; line 65, "Q" should read --$Q_N$--.

Column 22, line 3, "]y" should read --$]_2$--; line 50, "L'is" should read --L' is--.

Column 23, line 2, "$R^{5'}$is" should read --$R^{5'}$ is--.

Column 24, line 4, "sulfuir" should read --sulfur--; line 21, insert a space before "capping"; line 50, cancel the bracket before the formula.

Column 25, line 13, "L'is" should read --L' is--; line 63, at the end of the formula, cancel "z".

UNITED STATES PATENT AND TRADEMARK OFFICE
CERTIFICATE OF CORRECTION

PATENT NO. : 6,031,060
DATED : February 29, 2000
INVENTOR(S) : Letchford et al.

It is certified that error appears in the above-identified patent and that said Letters Patent is hereby corrected as shown below:

Column 26, lines 23 and 29, "claims 1" should read --claim 1--; line 35, before "and" insert --in which FG--; line 39, after "compounds" insert --, or mixtures of one or more dienes with one or more alkenylsubstituted aromatic compounds--; line 41, "connection" should read --connecting--; line 53, "interger" should read --integer--; line 55, "amd" should read --and--.

Signed and Sealed this

Third Day of April, 2001

Attest:

NICHOLAS P. GODICI

*Attesting Officer*   *Acting Director of the United States Patent and Trademark Office*